Patented Dec. 19, 1922.

1,439,293

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

METHOD OF MAKING CELLULOSE COMPOUNDS.

No Drawing.   Application filed December 23, 1921.   Serial No. 524,495.

*To all whom it may concern:*

Be it known that I, JOHN COLLINS CLANCY, a subject of the King of Great Britain, residing at Providence, in the county of Providence and State of Rhode Island, have invented certain new and useful Improvements in Methods of Making Cellulose Compounds, of which the following is a specification.

This invention relates to a method of making cellulose compounds and more particularly to an improved method of obtaining solutions of cellulose compounds capable of wide use in the arts.

The principal object of the invention is to provide a method of treatment whereby the nitrates of cellulose may be placed in solution in menstrua not ordinarily capable of dissolving these substances, whereby the solutions may be applied to a great variety of uses for which the solvents employed up to the present time are not ordinarily adapted. This may be accomplished by slightly different methods of operation which are essentially alike in that they comprehend the use of a novel solvent, such as is described in my copending application Serial No. 482,173, filed July 2, 1921, as a transferring media for initially dissolving the cellulose nitrates or so acting upon them as to render them soluble in various menstrua which have heretofore been generally incapable of use for this purpose.

Other objects and advantages of the invention relate to certain novel steps and combinations of steps involved in the treatment of the material as will be more fully set forth in the detailed description to follow.

As described in my copending application above referred to, I have found that liquid anhydrous ammonia serves as an excellent solvent for the nitrates of cellulose generally, being capable of readily dissolving the higher nitrates which have heretofore been regarded as insoluble or soluble only in a very limited number of solvents. I have also found that the higher nitrates, as well as the more readily soluble lower nitrates, can be dissolved in liquid anhydrous ammonia without being degraded, that is, without losing their structural aggregates.

In extending my researches relative to the action of liquid anhydrous ammonia upon cellulose nitrates I have found that not only is it possible to dissolve the nitrates of cellulose in liquid anhydrous ammonia but that the solutions thus formed may be transferred into other suitable menstrua and upon evaporating off the ammonia the nitrates will remain in solution in the menstrua to which they have been transferred even though the nitrates were not initially soluble in such menstrua, in effecting the solution of the cellulose nitrates in the liquid anhydrous ammonia and their transfer in solution into the solvent menstrua, I may first place the cellulose nitrates in a sufficient quantity of ammonia to entirely dissolve the nitrates to form a clear solution and then add the menstrua into which it is desired to transfer the nitrates in solution, and subsequently evaporate off the ammonia to leave the cellulose nitrates in solution in the added menstrua. This operation may be carried out under pressure sufficient to maintain the ammonia in its liquid state and the evaporation of the ammonia may be effected by reducing the pressure after the transfer of the mass into the desired menstrua.

As an alternative method of operation, I have found that the same result may be accomplished by first slightly moistening the cellulose nitrates with liquid anhydrous ammonia which quickly changes the nitrates to a gelatinous mass even when the ammonia is not added in a sufficient quantity to form a clear solution. The cellulose nitrates thus treated with anhydrous ammonia when transferred to the menstrua mentioned will immediately form a clear transparent solution, of any degree of viscosity desired and when the process is carried out by this method the use of pressure may be dispensed with as a sufficient quantity of ammonia will remain in the cellulose nitrates during the transfer to the solvent menstrua, even at atmospheric pressure, to render the nitrates soluble in the menstrua.

As illustrative of the substances which may be employed as a menstruum for receiving the cellulose nitrates and in which the cellulose nitrates will pass into solution after having been treated with anhydrous ammonia. I preferably employ a liquid formed by mixing either tetrachlorethane, carbon tetrachloride, chloroform, benzene, benzine, chlorethane, monochlorethane, naphthalene, or any of the chloraromatic compounds with an aliphatic or aromatic alcohol, or an aliphatic or aromatic alcohol ester (such as the acetates) including ethyl alcohol, methyl alcohol, butyl alcohol, ethyl acetate, butyl acetate, amyl acetate, etc. While I have found that mixtures such as described above are excellently adapted to serve as menstrua to receive the ammonia treated cellulose nitrates for forming therewith clear solutions, I may also employ for that purpose any of the aliphatic or aromatic alcohols, either separately or in mixtures, or any of the above mentioned alcohols mixed with one or more of the aliphatic alcohols or esters or aromatic alcohol esters.

As illustrative of the proportions of the several liquids which have been found satisfactory in forming menstrua for the reception of the ammonia treated cellulose nitrates, the following examples are given:

1. Treat cellulose nitrate with liquid anhydrous ammonia sufficiently to moisten the cellulose nitrate, and immediately pass the nitrate into a liquid composed of 90% carbon tetrachloride and 10% of either ethyl alcohol or butyl alcohol or methyl alcohol or propyl alcohol. On evaporating off the ammonia the cellulose nitrate will remain in solution in the liquid.

2. Treat cellulose nitrate with a sufficient quantity of liquid anhydrous ammonia to thoroughly moisten the nitro-cellulose and reduce it to a gelatinous mass, then transfer the mass into a liquid composed of 90% chloroform and 10% alcohol (either ethyl, methyl, butyl or propyl). The gelatinous mass will pass into solution in the liquid and on evaporating off the ammonia a clear solution of nitro-cellulose in the menstruum will remain.

3. Treat cellulose nitrate with liquid anhydrous ammonia to form a gelatinous mass, then transfer the nitro-cellulose thus treated into a liquid composed of 90% tetrachlorethane and 10% alcohol (either ethyl, methyl, butyl or propyl.) The nitro-cellulose will pass into solution in the liquid and will remain therein in a clear solution after the ammonia has been evaporated off.

4. Treat cellulose nitrate with liquid anhydrous ammonia to thoroughly moisten the same and then transfer the moistened nitro-cellulose into a liquid formed by adding 10% alcohol (either ethyl, methyl, butyl or propyl) to 90% trichlorethane. The nitro cellulose will pass into solution in the mixture and remain in a clear solution after the ammonia has been removed by evaporation.

5. Treat cellulose nitrate with liquid anhydrous ammonia by adding sufficient ammonia to thoroughly moisten the nitro-cellulose and then transfer the mass into a liquid formed from 90% dichlorethane and 10% alcohol (either ethyl, methyl, butyl or propyl.) The nitro-cellulose will form a clear solution in the menstruum and will remain in solution after the evaporation of the ammonia.

6. Treat cellulose nitrate with liquid anhydrous ammonia by thoroughly moistening the nitro-cellulose to form a gelatinous mass. Transfer the gelatinous mass into a liquid formed by adding any per cent of butyl and ethyl alcohol i. e. 50% of butyl alcohol to 50% of ethyl alcohol. The ammonia treated cellulose nitrate will immediately pass into solution in the menstruum, and will remain in solution after the ammonia has been removed by evaporation.

7. Treat cellulose nitrate with liquid anhydrous ammonia to make a jelly of the same and then add carbon tetrachloride and a small proportion of alcohol (methyl, ethyl, butyl or propyl), heat to evaporate off the ammonia. The cellulose nitrate will remain in solution. This solution can be made of the right thickness and viscosity by varying the amount of any of the volatile solvents used so as to flow properly during the formation of the mass into a sheet of film or thread under the well known methods now in use.

It is to be understood that the above examples are cited for the purpose of illustration only, and that the invention is in no sense to be limited thereby either with respect to the proportionate quantities of the liquids employed in forming the menstruum, the particular substances indicated as used or the extent to which the cellulose nitrate is initially treated with liquid anhydrous ammonia before transference into the menstruum named, it being regarded as within the scope and intent of the present invention to vary the proportions of the liquids employed as may be found desirable for the purpose of producing a solution which may be particularly adapted for use in the particular case in which it is to be employed, while as previously stated the invention comprehends the use of all the liquids previously mentioned herein for forming the menstruum as well as the chloraromatic compounds broadly and the aliphatic and aromatic alcohols generally together with the esters thereof. The invention also comprehends the use of anhydrous liquid ammonia in initially treating the cellulose nitrates either to the extent of forming a clear solution thereof prior to the transference of the mass into the menstruum or the moistening of the cellulose nitrate sufficiently to cause the same to pass into a gelatinous solution upon transference into the menstruum, and the word "treating" as employed throughout the specification and claims is to be construed as covering either the treating to form a clear solution or the moistening sufficiently to effect solution of the nitro-cellulose in the menstruum. It is also to be understood that my invention embraces the initial treatment of the cellulose nitrates with anhydrous ammonia whether effected under super-atmospheric pressure or at atmospheric pressure.

It will be noted that many of the liquids mentioned above as adapted for use in forming the menstruum into which the cellulose nitrates may be transferred and in which they will form solutions are inherently non-inflammable and are not solvents for cellulose nitrates (especially the higher nitrates).

These considerations greatly enhance the practical value of the present invention and impart to the described process a wide field of usefulness, since the present process permits of the forming of a relatively non-inflammable nitro-cellulose solution and gives a wide latitude in the choice of materials from which a menstruum possessing the desired characteristics may be prepared.

Having described my invention, what I claim is:

1. The process of making cellulose compounds, which comprises, dissolving cellulose nitrate in liquid anhydrous ammonia, and then transferring the dissolved nitrate into a menstruum in which the nitrate is not initially soluble.

2. The process of making cellulose compounds, which comprises, dissolving cellulose nitrates in liquid anhydrous ammonia, and then transferring the dissolved nitrates into a menstruum containing an alcohol.

3. The process of making cellulose compounds, which comprises, dissolving cellulose nitrate in liquid anhydrous ammonia, transferring the dissolved nitrate into a menstruum in which it is not initially soluble, and then evaporating off the ammonia.

4. The process of making cellulose compounds, which comprises, dissolving cellulose nitrate in liquid anhydrous ammonia under pressure, and then transferring the dissolved nitrate into a menstruum in which the nitrate is not initially soluble.

5. The process of making cellulose compounds, which comprises, dissolving cellulose nitrate in liquid anhydrous ammonia under pressure, transferring the dissolved nitrate into a menstruum in which it is not initially soluble, and then evaporating off the ammonia.

6. The process of making cellulose compounds, which comprises, treating cellulose nitrate with anhydrous ammonia, and then transferring the nitrate thus treated in a menstruum in which the nitrate is not initially soluble.

7. The process of making cellulose compounds, which comprises, treating cellulose nitrate with anhydrous ammonia, and then transferring the nitrate thus treated in a menstruum containing an alcohol.

8. The process of making cellulose compounds, which comprises, treating cellulose nitrate with anhydrous ammonia, dissolving the nitrate thus treated in a menstruum containing an alcohol, and evaporating off the ammonia contained in the nitrate.

9. The process of making cellulose compounds, which comprises, treating cellulose nitrate with anhydrous ammonia, passing the cellulose nitrate thus treated into solution in a menstruum in which the nitrate is not initially soluble, and evaporating off the ammonia.

10. The process of making cellulose compounds, which comprises, treating cellulose nitrate with anhydrous ammonia, and passing the nitrate thus treated into solution in a liquid the major portion of which is inherently non-inflammable.

11. The process of making cellulose compounds, which comprises, treating cellulose nitrate with anhydrous ammonia, passing the nitrate thus treated into solution in a liquid the major portion of which is inherently non-inflammable, and then removing the ammonia present in the nitrate.

12. The process of making cellulose compounds, which comprises, treating a cellulose nitrate with anhydrous ammonia, and passing the nitrate thus treated into solution in a liquid containing a non-inflammable constituent.

13. The process of making cellulose compounds, which comprises, treating cellulose nitrate with anhydrous ammonia, and passing the nitrate thus treated into solution in a menstruum containing a relatively non-inflammable liquid and an aliphatic alcohol.

14. The process of making cellulose compounds, which comprises, treating cellulose nitrate with anhydrous ammonia, passing the nitrate thus treated into solution in a menstruum containing a relatively non-inflammable liquid and an aliphatic alcohol, and then evaporating off the ammonia from the mixture.

15. The process of making cellulose compounds, which comprises, initially treating cellulose nitrate with anhydrous ammonia, and then passing the nitrate thus treated into solution in a liquid containing a chlorinated hydrocarbon.

16. The process of making cellulose compounds, which comprises, initially treating cellulose nitrate with anhydrous ammonia, and then passing the nitrate thus treated into solution in a liquid containing a hydrocarbon.

17. The process of making cellulose compounds, which comprises, initially treating cellulose nitrate with anhydrous ammonia, and then passing the nitrate thus treated into solution in a liquid containing a chlorinated hydrocarbon and an alcohol.

In testimony whereof I have affixed my signature.

JOHN COLLINS CLANCY.